United States Patent [19]

Garza et al.

[11] 4,168,860
[45] Sep. 25, 1979

[54] MULTI-PURPOSE CONVERTIBLE SEAT CONSTRUCTION

[75] Inventors: Luis R. Garza; William J. Astleford, both of San Antonio, Tex.

[73] Assignee: Lifetime Foam Products, Inc., Franklin Park, Ill.

[21] Appl. No.: 881,666

[22] Filed: Feb. 27, 1978

[51] Int. Cl.² .............................................. B60N 1/02
[52] U.S. Cl. .............................................. 297/92; 5/47
[58] Field of Search ................. 297/92, 94, 64; 5/47, 5/37; 296/65 R

[56] References Cited
U.S. PATENT DOCUMENTS

| 766,924 | 8/1904 | Bachand | 5/47 |
|---|---|---|---|
| 802,599 | 10/1905 | Rolph | 5/47 |
| 818,250 | 4/1906 | Hulse | 5/47 |
| 2,060,737 | 11/1936 | Lieberman | 5/47 |
| 2,294,475 | 9/1942 | McAllister | 5/47 |
| 2,710,769 | 6/1955 | Rosenthal | 296/65 R |
| 3,844,608 | 10/1974 | Freedman | 297/92 |
| 3,856,347 | 12/1974 | Bell et al. | 297/92 |
| 4,085,962 | 4/1978 | Wahls | 296/65 R |

Primary Examiner—Francis K. Zugel
Attorney, Agent, or Firm—Arnstein, Gluck, Weitzenfeld & Minow

[57] ABSTRACT

A multi-purpose convertible seat construction including a back section and a seat section interconnected and supported so that they may be selectively positioned to constitute a forwardly facing seat, a rearwardly facing seat or a sleep surface in which the back and seat sections are disposed in coplanar relation.

4 Claims, 9 Drawing Figures

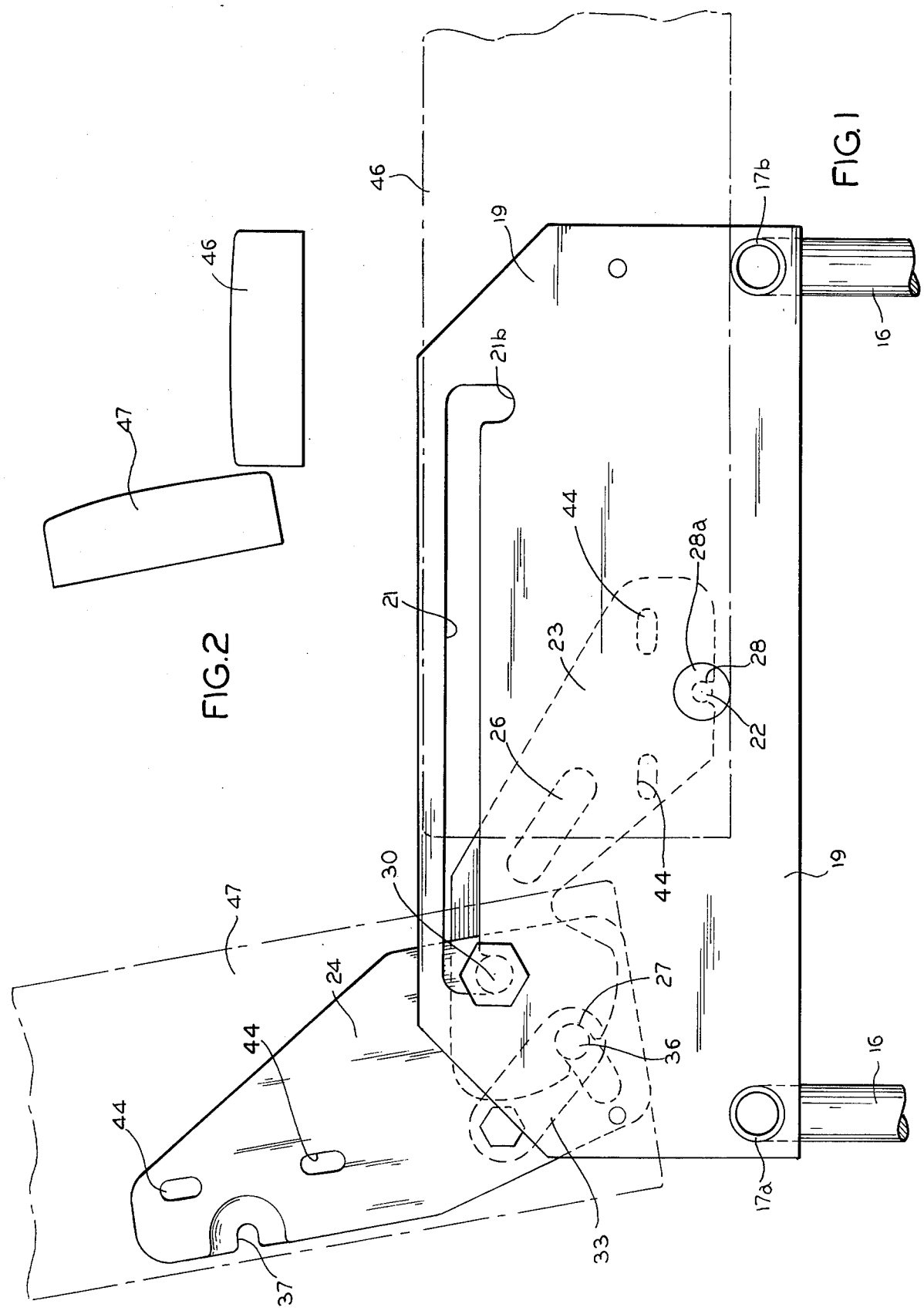

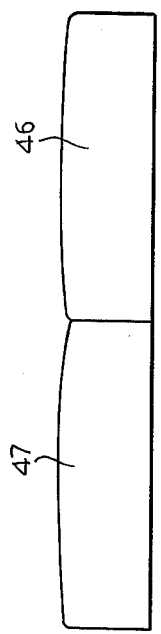
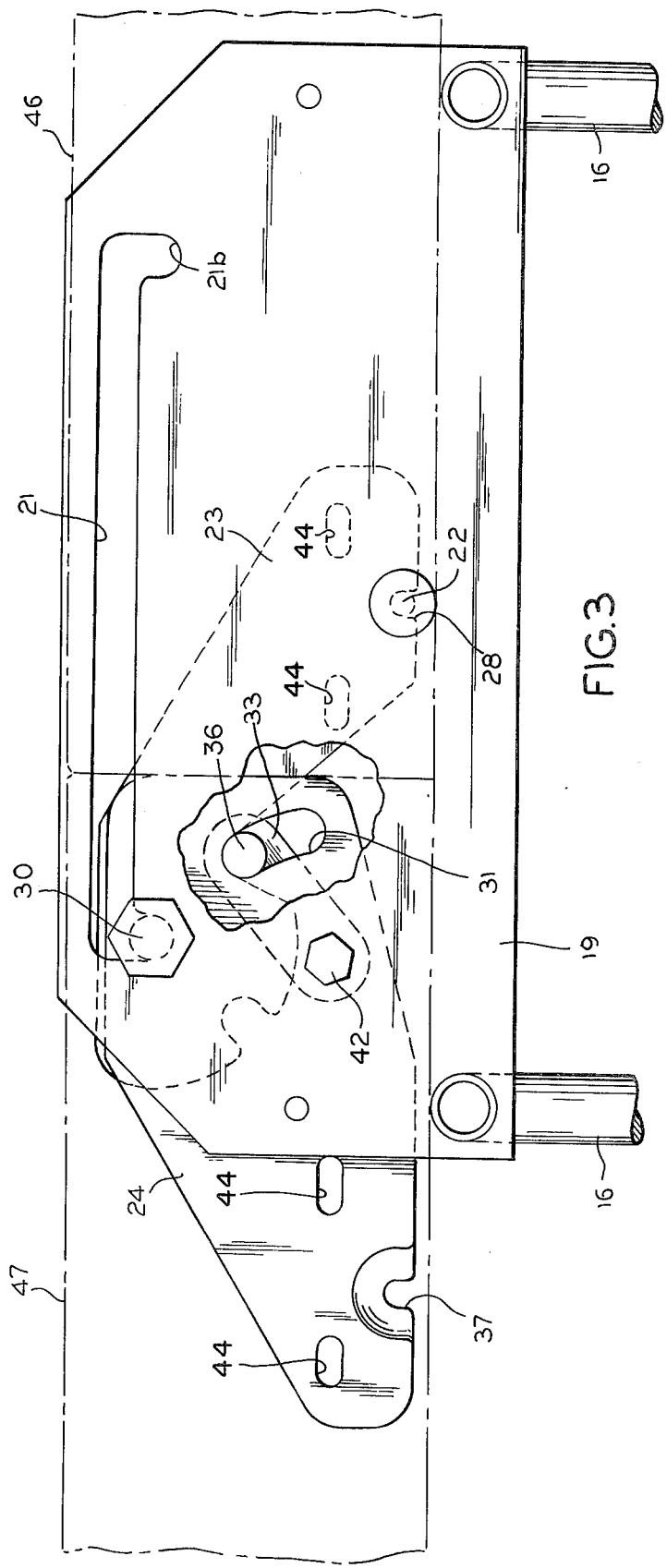

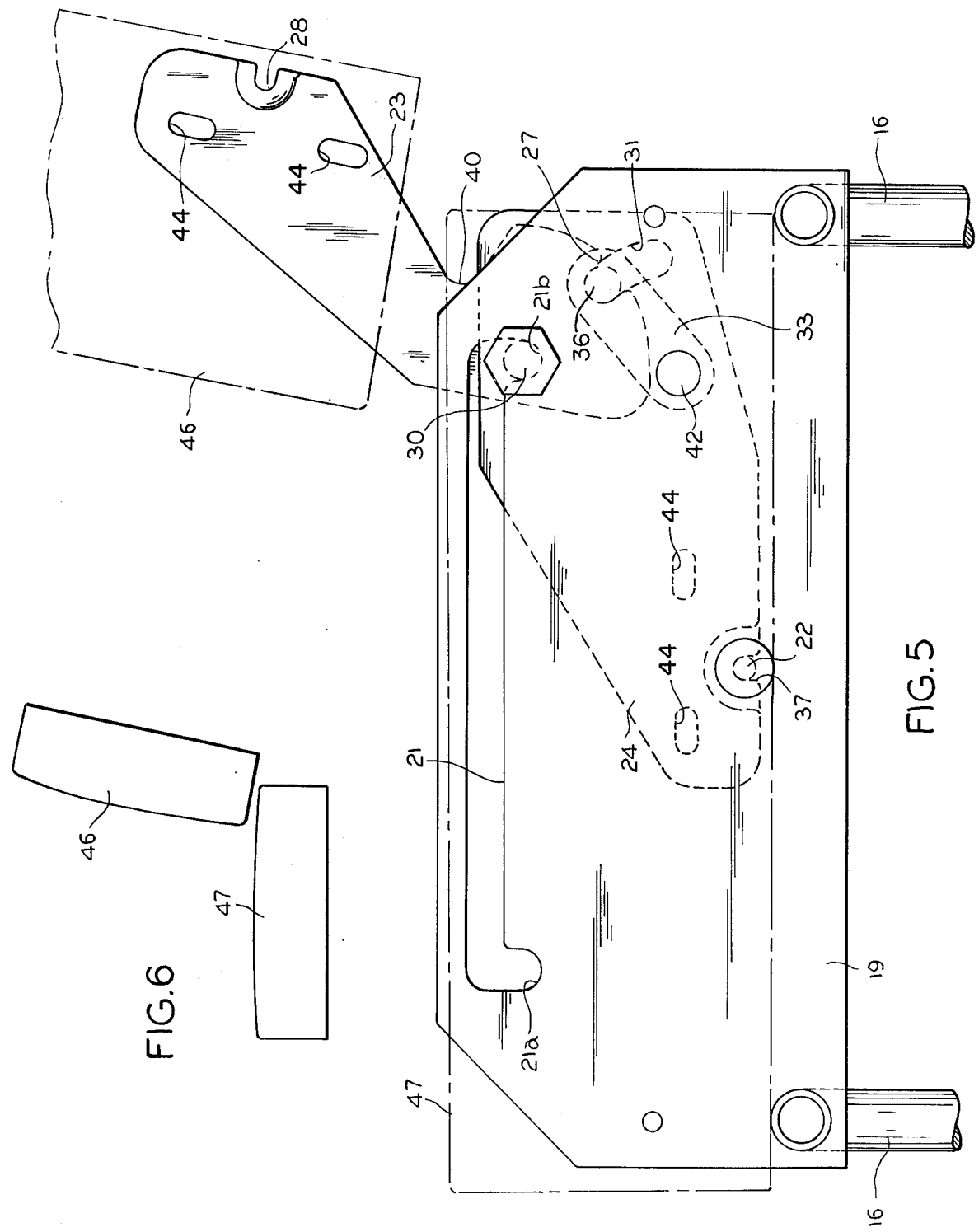

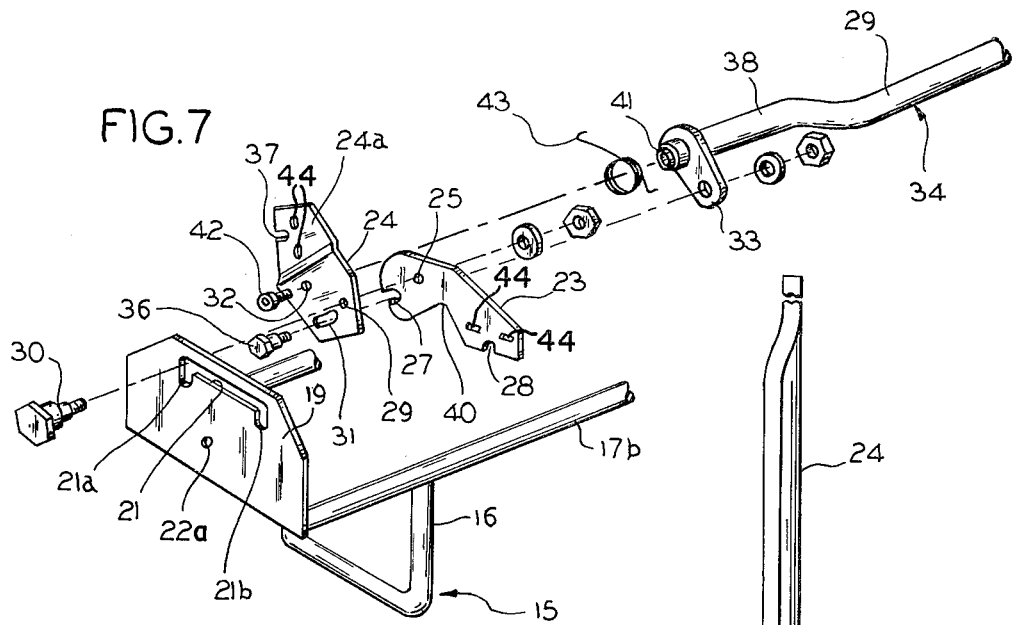
FIG.7
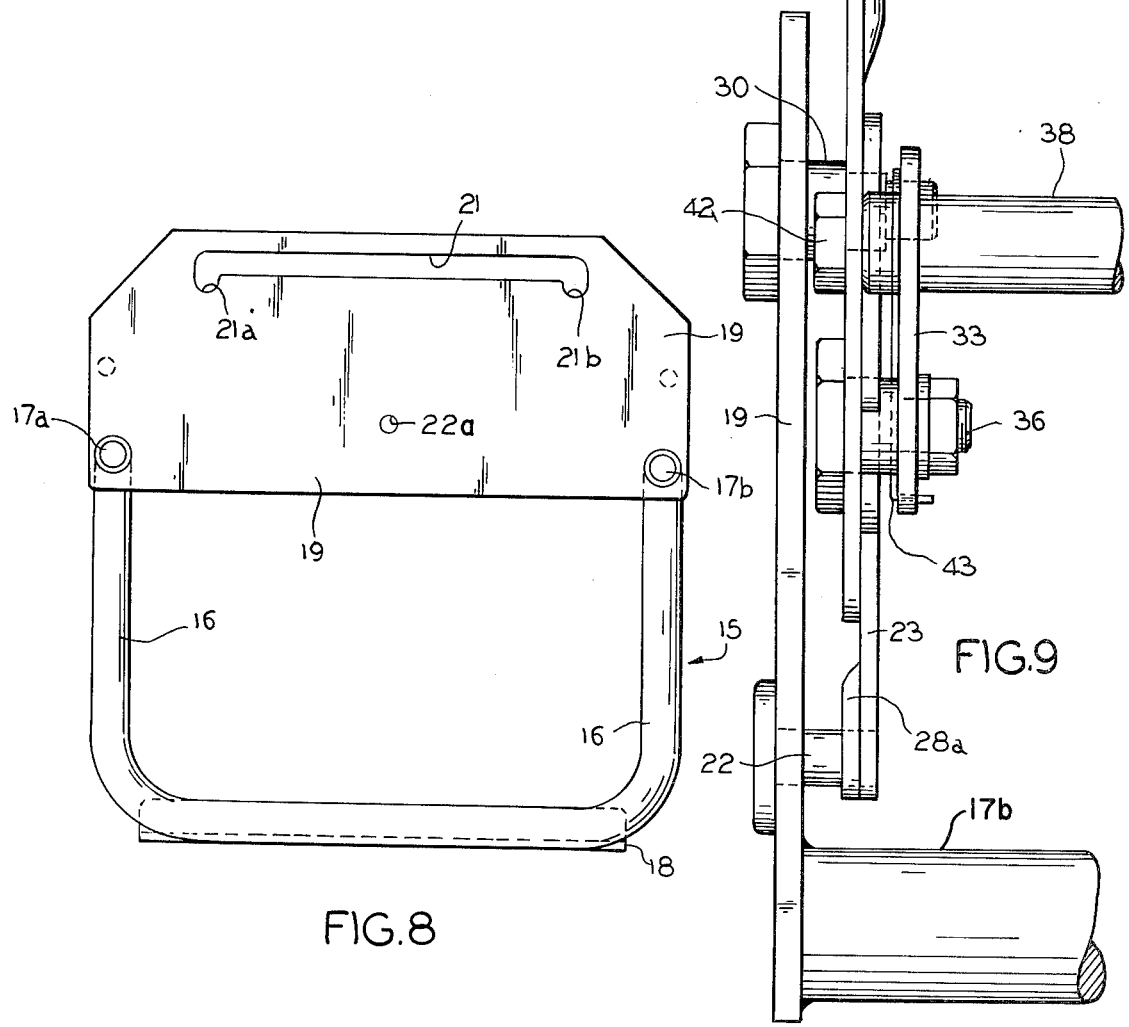
FIG.8
FIG.9

4,168,860

MULTI-PURPOSE CONVERTIBLE SEAT CONSTRUCTION

BACKGROUND OF THE INVENTION

This invention relates to a multi-purpose convertible seat construction.

Commercially manufactured van-type recreational vehicles quite frequently are outfitted or customized by their owners who install van furniture and other convenience items. Such vehicles then serve as mobile living accommodations. Because the available space behind the driver's seat usually is limited it is desirable to make maximum use of the space by utilizing furniture items which advantageously can serve multiple functions. An example of a multi-function item is a convertible bench-bed-dinette combination which generally consists of two bench seats bolted to the floor pan of the van and which may be selectively manipulated to achieve any one of the following configurations:

1. Two forwardly facing seats.
2. Two rearwardly facing seats.
3. One forwardly and one rearwardly facing seat in opposed confronting relation for dining; and
4. A sleep surface which is achieved by arranging the seatbacks in co-planar relation with the seating surfaces.

Among the disadvantages inherent in the prior art bench-bed-dinette units are the following:

1. Mechanisms which are difficult to operate and which frequently present injury hazards to the hands of the user.
2. A seat structure and operating mechanism which has undesirable mechanical and esthetic qualities.
3. A seat construction and design which must be adapted to each annual change in style and model of the vans.
4. A seat construction and design which requires the use of separate fore and aft seats depending upon which side of the vehicle the unit is installed.

SUMMARY OF THE INVENTION

A prime object of the present invention is the provision of a universal bench seat which eliminates the foregoing disadvantages while maintaining functional versatility.

Another object of this invention is the provision of a seat unit of the foregoing character which, without modification, may be installed in any van without concern as to whether the seat should be positioned fore or aft or positioned over the left or right interior wheel well housing.

Other and further objects and advantages of this invention will become apparent from the following description when considered in connection with the accompanying drawings.

BRIEF DESCRIPTION OF THE DRAWINGS

FIG. 1 is a fragmentary side elevational view of a bench seat, in accordance with my invention, and showing the relationship of the components when the bench seat is in an upright sitting configuration.

FIG. 2 is a schematic view showing the relationship of the seat and back components in the configuration of FIG. 1.

FIG. 3 is a view similar to FIG. 1 showing the relationship of the components in a bed configuration.

FIG. 4 is a schematic view showing the relationship of the seat and back components in the configuration of FIG. 3.

FIG. 5 is a view similar to FIG. 1 showing the relationship of the components when the bench seat is in an upright configuration, opposite from that shown in FIG. 1.

FIG. 6 is a view similar to FIG. 2 showing the relationship of the seat and back components in the configuration of FIG. 5.

FIG. 7 is a perspective view of certain of the components in exploded relation.

FIG. 8 is an end elevational view of structural details; and,

FIG. 9 is a front elevational view, on an enlarged scale, of the components shown in FIG. 7, in assembled relation.

BRIEF DESCRIPTION OF A PREFERRED EMBODIMENT

The mechanical structure hereinafter to be described includes a pair of hinge mechanisms, there being one at each side of the bench-bed unit on the supporting chassis or frame. It will be understood that the hinge mechanisms when assembled with the other unit components constitute but a single mechanism. Only one such hinge mechanism is herein defined, they being identical for all practical purposes.

Referring to FIGS. 7 and 8 the bench-bed unit comprises a chassis or frame 15 formed of a pair of generally U-shaped floor engaging tubular leg members 16 to the upper ends of which are welded in parallel relation a pair of longitudinally extending tubular frame members 17a, 17b. An angle iron 18 is welded to the bight portion of each leg member 16 and is provided with a plurality of holes to receive suitable fastening elements by which the leg members may be bolted to the floor of a vehicle, such as a van. Secured to corresponding opposite ends of the longitudinal frame members 17a, 17b are a pair of identical support plates 19 disposed in vertical parallel relation. Each of the plates 19 is provided near its upper edge with an elongated slot 21 with the ends of the slot terminating in bearing portions 21a, 21b extending below the lower edge of the slot. The plate 19 is drilled substantially medially thereof to accommodate a headed pin 22 welded therein and extending laterally of the inner face of the plate 19. A pair of hinge members 23 and 24, hereinafter to be described in greater detail, are pivotally secured to the support plate 19 by a bolt 30 passing through registering openings in the hinge members and the elongated slot 21 of the support plate 19.

The hinge member 23 preferably is formed of sheet metal and is shaped substantially as illustrated in FIGS. 1, 3 and 5. The member 23 is provided with a hole 25, the center of which constitutes its pivotal axis. A portion of the surface is embossed as at 26 to provide a raised surface. As seen in FIG. 1 a first notch 27 is provided in the edge of the member 23 to the left of hole 25, and a second notch 28 is provided in the ege to the right of hole 25. The marginal area 28a surrounding the notch 28 is embossed to offset the notch from the plane of the body of member 13. Embossed portions 26 and 28a are on the same surface.

The hinge member 24 similarly, is formed of sheet metal and as seen in FIG. 7 includes a portion 24a which is slightly offset from the plane of the main body portion. The hinge member 24 is provided with a hole 29. A stepped bolt 30 is passed through the holes 25, 29 and slot 21 to pivotally secure the members 23 and 24 to plate 19. An arcuate slot 31 is provided in the member 24 to the right of hole 29, as viewed in FIG. 5. The radial center for the arcuate slot 31 is the center of an opening 32 provided in the member 24. A notch 37 is provided in an edge of the member 24, the notch being located to the left of the pivotal axis of member 24, as viewed in FIG. 5.

A hinge link arm 33 is welded to each end of a tubular latch handle 34. The distal end of the link arm 33 is drilled to receive a pin 36 which extends into the arcuate slot 31. The handle 34 includes end portions 38 which are in co-axial registration and an intermediate portion 39 which is offset from the end portions. A stepped bushing 41 is anchored in each end portion 38 and each bushing is secured to a hinge member 24 by a screw 42. A torsion spring 43 is circumposed about the bushing 41 and its opposite ends respectively engage the member 24 and link arm 33 to bias the link arm 33 in a direction so that the pin 32 normally is at the upper end of slot 31, as viewed in FIG. 3. Suitable elongated holes 44 are provided in each of the hinge members 23 and 24 for receiving screws or other suitable fastening elements by which the hinge members 23 and 24 are secured to respective seat and back cushion members 46 and 47.

OPERATION

As shown in FIGS. 1 and 2, the bench-bed unit is arranged in an upright seating configuration with the cushion 47 located on the left side of the frame 15 and disposed substantially vertically and with the cushion 46 disposed in a horizontal position. In this configuration the bolt 30 is received in the bearing portion 31a and the pin 22 is engaged in notch 28 of hinge member 23. The cushion 46 thus is supported by pin 22 and also by the longitudinal frame member 17b. The bolt 36 of link arm 33 is received in notch 27 of hinge member 24 thereby locking the hinge members 23 and 24 in a fixed relation so that the cushions 46 and 47 are disposed in the configuration illustrated in FIG. 2.

When it is desired to reverse the seating configuration so that illustrated in FIGS. 5 and 6, the cushions 46 and 47 while in the same rigid relationship as illustrated in FIG. 1 are lifted to disengage the bolt 30 from the bearing portion 20a and to align the bolt 30 with the slot 21. In such movement the notch 28 is disengaged from pin 22 and both cushions 46 and 47 now are shifted to the opposite side of the frame 15 wherein the bolt 30 is received in bearing portion 21b. Utilizing this bearing portion as a fulcrum, the cushions 46 and 47 are rocked in a counterclockwise direction, as viewed either in FIGS. 1 or 5, to the point where the notch 37 of hinge member 24 engages pin 22, thereby locking the cushions 46 and 47 in the configuration shown in FIGS. 5 and 6. It is noted that in this configuration cushion 47 is supported on pin 22 and frame member 17a.

When it is desired to change the positions of the cushions 46 and 47 from the sitting configuration of FIGS. 5 and 6 to the coplanar relation of the bed configuration shown in FIGS. 3 and 4, the latch release handle 34 is manipulated to rock link arm 33 in a direction such that pin 36 is disengaged from notch 27 thereby permitting relative pivotal movement of the hinge members 23 and 24 to the point where the pin 36 enters the recess 40 in hinge member 23. It is noted that the arcuate slot 31 through which pin 36 is passed limits the travel of link arm 33 and pin 36. The cushions 46 and 47 now are in juxtaposition and coplanar and, in order to move them to the final position shown in FIG. 3, they must be lifted to move the bolt 30 out of engagement with the bearing portion 21a and also to disengage the notch 37 from pin 22. Both cushions then are shifted to the opposite side of the frame 15, to the left, as viewed in FIG. 3, so that the bolt 30 now engages in bearing portion 21a and notch 28 engages pin 22. The cushions now are locked in the configuration shown in FIGS. 3 and 4 against inadvertent displacement and are rested on the frame members 17a and 17b, as shown.

It is contemplated to that two such bench bed units, as above described, will be utilized concurrently and when installed will be so positioned in relation to each other that when the cushions 46 and 47 of the respective units are horizontally positioned they will provide a continuous sleep surface formed of four cushions in linear alignment thus, providing a sleep surface of adequate dimensions. It will be apparent from the foregoing that the bench-bed units may be selectively manipulated to achieve a variety of different combinations of configurations, for example, two forwardly facing seats; two rearwardly facing seats; one forwardly and one rearwardly facing seat and a sleep surface.

It will be understood that the leg members 16 may be welded to the frame members 17a, 17b at any suitable points along the frame members. Desirably, one of the leg members should be positioned at a suitable point spaced inwardly from corresponding ends of frame members 17a, 17b so as to clear the wheel housings in the interior of a van when installed therein.

Various changes coming within the spirit of our invention may suggest themselves to those skilled in the art; hence, we do not wish to be limited to the specific embodiments shown and described or uses mentioned, but intend the same to be merely exemplary, the scope of our invention being limited only by the appended claims.

We claim:

1. A multi-purpose convertible seat construction comprising, a frame, a pair of spaced verticle support plates carried on said frame, each support plate having an elongated horizontal slot, each end of which constitutes a detent bearing portion, each said support plate having a medially disposed first pin extending laterally from a surface thereof, two pairs of first and second hinge members, each hinge member having an opening in the body thereof and each pair of hinge members being pivotally secured to a respective support plate by a bolt passing through registering openings in said first and second hinge members and the horizontal slot of the support plate, said first hinge member having first and second spaced edge notches and a detent recess intermediate said notches, said second hinge member having an arcuate slot in the body thereof and a third notch in in an edge thereof, a link arm pivotally secured to said second hinge member and carrying at its distal end a second lateral pin extending through and movable within said arcuate slot, a first cushion secured to a pair of said first hinge members, a second cushion secured to a pair of said second hinge members, said cushions and pairs of hinge members being relatively movable to selectively engage the bolts in registering detent bearing portions with said first pins engaged in said first notches and said second pins engaged in said second notches so as to lock said first and second hinge member in angular relation to each other and rigid with said frame whereby one of said cushions is disposed horizontally so as to constitute a seat and the other of said cushions is disposed substantially vertically to constitute a back, said cushions and hinges after disengagement of said notches from respective pins being shiftable to the opposite ends of said horizontal slots to engage the bolts with the opposite detent bearing portions, said cushions thereafter being rockable about the axis of said bolts to reverse the positions of said cushions so as to constitute the previous seat a back and the previous back a seat and in such position to engage the third notch with said first pin so as to lock said cushions together in fixed angular relation.

2. A multi-purpose convertible seat construction comprising a frame, a first seating section, a second seating section, means at each side of said frame interconnecting said first and second seating sections and mounting the same upon said frame for relative movement thereto and to each other from sitting positions to a reclining position, said means including a vertical support plate at each end of said frame, each support plate having a medially disposed first pin extending laterally and an elongated horizontal slot, each end of which constitutes a detent bearing portion, a first pair of hinge members secured to said first seating section, a second pair of hinge members secured to said second seating section, a bolt passing through each horizontal slot and registering openings in each said first and second hinge members and pivotally securing said hinge members to a respective support plate, each of said first hinge members having first and second spaced edge notches and a detent recess intermediate said notches, each of said second hinge members having an arcuate slot in the body thereof and a third notch in an edge thereof, a link arm pivotally secured to each of said second hinge members and carrying at its distal end a second lateral pin extending through and movable within said arcuate slot, said seating sections being relatively movable to selectively engage the bolts in registering detent bearing portions with said first pins engaged in said first notches and said second pins engaged in said second notches so as to lock said first and second seating sections in angular relation to each other and rigid with said frame whereby one of said seating sections is disposed horizontally so as to constitute a seat and the other of said seating sections is disposed substantially vertically to constitute a back, said seating sections after disengagement of said notches from respective pins being shiftable to engage the bolts in opposite registering detent bearing portions and to engage the third notches with said first pins thereby to lock said seating sections together in fixed angular relation so as to constitute the previous seat a back and the previous back a seat.

3. The invention as defined in claim 1 in which the second lateral pin carried on said link arm when disengaged from said first notch permits said cushions to be moved to coplanar position, said cushions being locked in said coplanar position when said lateral pin is engaged in said intermediate detent recess.

4. The invention as defined in claim 2 in which the second lateral pin carried on said link arm when disengaged from said first notch permits said seating sections to be moved to coplanar postion, said seating sections being locked in said coplanar position when said second lateral pin is engaged in said intermediate detent recess.

* * * * *